(12) United States Patent
Bang et al.

(10) Patent No.: US 10,328,988 B2
(45) Date of Patent: Jun. 25, 2019

(54) SCOOTER

(71) Applicant: Ford Global Technologies LLC, Dearborn, MI (US)

(72) Inventors: Eui Shik Bang, Nanjing (CN); James Yu-Hsin Kuo, Farmington Hills, MI (US); Chelsia Ka Po Lau, Ann Arbor, MI (US); Daniel Tang, Nanjing (CN); Jack Li, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 78 days.

(21) Appl. No.: 15/664,209

(22) Filed: Jul. 31, 2017

(65) Prior Publication Data
US 2018/0037288 A1    Feb. 8, 2018

(30) Foreign Application Priority Data
Aug. 2, 2016    (CN) .......................... 2016 1 0626022

(51) Int. Cl.
*B62H 1/06*    (2006.01)
*B62J 7/02*    (2006.01)
(Continued)

(52) U.S. Cl.
CPC .............. *B62K 11/10* (2013.01); *B62H 1/06* (2013.01); *B62J 7/02* (2013.01); *B62J 7/08* (2013.01);
(Continued)

(58) Field of Classification Search
CPC .... B62K 2202/00; B62K 3/002; B62K 11/10; B62K 15/00; B62K 15/006; B62K 7/02; B62K 7/04; B62K 19/40; B62K 21/12; B62K 21/22; B62K 2204/00; B62K 2700/58; B62K 2700/60; B62H 1/06; B62J 7/02; B62J 7/08; B62J 99/00; B62D 21/14; B62M 6/40; B62M 6/90; B62M 7/08
(Continued)

(56) References Cited

U.S. PATENT DOCUMENTS 1,743,121 A * 1/1930 Edele ....................... B62M 1/14
                                                        280/240
2,995,384 A * 8/1961 Rich ......................... B62K 5/02
                                                        280/152.1
(Continued)

FOREIGN PATENT DOCUMENTS

CN    103587618 A         2/2014
DE         10204478 A1 *  8/2003 ................ B62J 7/06
(Continued)

OTHER PUBLICATIONS

Tag Archives: Jack Electric Scooter; Oct. 31, 2015.

*Primary Examiner* — Laura Freedman
(74) *Attorney, Agent, or Firm* — Brandon Hicks; Kolitch Romano LLP

(57) ABSTRACT

A scooter is provided. The scooter comprises a frame assembly including a main frame for a user, an extendable frame movably connected to the main frame and configured to be extendable away from the main frame at an interface at which the main frame and the extendable frame meet, and a wheel assembly connected to the frame assembly. The extendable frame forms a cargo space at an extended position.

16 Claims, 4 Drawing Sheets

(51) Int. Cl.
  *B62J 7/08* (2006.01)
  *B62K 3/00* (2006.01)
  *B62K 7/04* (2006.01)
  *B62M 6/40* (2010.01)
  *B62M 6/90* (2010.01)
  *B62M 7/08* (2006.01)
  *B62J 99/00* (2009.01)
  *B62K 11/10* (2006.01)
  *B62K 15/00* (2006.01)
  *B62K 21/12* (2006.01)
  *B62K 21/22* (2006.01)

(52) U.S. Cl.
  CPC ............... *B62J 99/00* (2013.01); *B62K 3/002* (2013.01); *B62K 7/04* (2013.01); *B62K 15/00* (2013.01); *B62K 15/006* (2013.01); *B62K 21/12* (2013.01); *B62K 21/22* (2013.01); *B62M 6/40* (2013.01); *B62M 6/90* (2013.01); *B62K 2202/00* (2013.01); *B62K 2204/00* (2013.01); *B62K 2700/58* (2013.01); *B62M 7/08* (2013.01)

(58) Field of Classification Search
  USPC .................................................. 280/278, 287
  See application file for complete search history.

(56) References Cited

U.S. PATENT DOCUMENTS

| | | | | |
|---|---|---|---|---|
| 3,249,171 A * | 5/1966 | Kinghorn | ............... | B62D 61/08 180/208 |
| 3,580,349 A * | 5/1971 | Brennan | ............. | B62D 21/183 180/208 |
| 4,452,327 A | 6/1984 | Mowat | ................... | B62K 5/025 180/11 |
| 5,064,209 A * | 11/1991 | Kurschat | ............... | B62K 5/025 280/204 |
| 5,092,616 A * | 3/1992 | McKinney | ................ | B62B 7/00 280/30 |
| 5,318,144 A * | 6/1994 | Berlinger, Jr. | ......... | B62K 5/025 180/208 |
| 5,584,494 A * | 12/1996 | Krumm | .................. | B62K 3/005 280/288.1 |
| 5,820,146 A * | 10/1998 | Van Ligten | ............. | B62B 1/002 280/87.041 |
| 6,158,751 A * | 12/2000 | Wu | ........................ | B62K 3/002 280/87.041 |
| 6,227,324 B1 * | 5/2001 | Sauve | .................... | B62D 61/02 180/181 |
| 6,460,866 B1 | 10/2002 | Altschul et al. | | |
| 6,601,862 B2 * | 8/2003 | Kettler | ..................... | B62K 9/02 280/231 |
| 6,793,248 B1 * | 9/2004 | Sung | ...................... | B62D 21/14 180/208 |
| 7,249,779 B2 * | 7/2007 | Ehrenreich | ............... | B62B 7/04 280/278 |
| 7,628,413 B2 * | 12/2009 | Gallipoli | ............ | A63C 17/0086 280/786 |
| 7,950,686 B2 * | 5/2011 | Wang | .................... | B62K 5/007 180/209 |
| 8,388,014 B2 * | 3/2013 | Wu | ........................ | B62D 21/14 180/208 |
| 8,534,405 B2 | 9/2013 | Kim et al. | | |
| 8,540,272 B1 * | 9/2013 | Vitale | ................... | B62D 47/003 280/638 |
| 8,613,458 B2 * | 12/2013 | Ghisolfi | ............... | B62K 15/006 280/87.01 |
| 8,864,159 B2 * | 10/2014 | Scolari | ..................... | B62K 3/02 280/220 |
| 9,016,702 B2 * | 4/2015 | Huang | ....................... | B62J 1/08 280/87.041 |
| 9,302,728 B1 * | 4/2016 | Yang | .................... | B62K 15/006 |
| 9,415,813 B2 * | 8/2016 | Ahn | ........................ | B62D 21/14 |
| 2002/0000339 A1 * | 1/2002 | Tsai | ........................ | B62K 3/002 180/65.1 |
| 2005/0043147 A1 * | 2/2005 | Huang | .................... | B62K 13/00 482/57 |
| 2005/0067206 A1 | 3/2005 | Trautman et al. | | |
| 2008/0203696 A1 * | 8/2008 | Akagi | .................. | A63B 21/068 280/238 |
| 2013/0240274 A1 * | 9/2013 | Vitale | .................. | B62D 47/003 180/65.1 |
| 2018/0194422 A1 * | 7/2018 | Christen | ................ | B62K 3/002 |

FOREIGN PATENT DOCUMENTS

| FR | 2913396 A1 * | 9/2008 | ............. B62K 3/002 |
|---|---|---|---|
| JP | 2014180938 A * | 9/2014 | |
| WO | WO-2010091460 A1 * | 8/2010 | ............... B62B 3/02 |
| WO | 2014177154 A1 | 11/2014 | |

\* cited by examiner

SCOOTER

RELATED APPLICATION

This application claims the benefit of Chinese Patent Application No. CN 201610626022.8 filed on Aug. 2, 2016, the entire contents thereof being incorporated herein by reference.

FIELD

The present disclosure relates to a scooter, particularly to a scooter with a variable wheel base.

BACKGROUND

In modern life, various transportation tools such as a bus and a subway are very friendly to people. Generally, passengers cannot directly arrive at their destinations via the public transportation system, and need to walk for some distance. Such "last one mile" walk may be challenge especially when the passengers carry luggage.

U.S. Pat. No. 8,534,405 discloses a scooter that can carry cargo. A wheel base of the scooter remains constant while a user space can be varied to adjust a cargo space. The inventors of the present application have recognized that this structure varies a foot standing area for a user and thus may cause inconvenience to the user. Further, the wheel base of the scooter occupies a relatively large space even when no cargo needs to be carried.

SUMMARY

According to one aspect of the present disclosure, a scooter is provided. The scooter includes a frame assembly and a wheel assembly connected to the frame assembly. The frame assembly includes a main frame for a user, and an extendable frame moveably connected to the main frame and is configured to be moveable relative to the main frame at an interface at which the main frame and the extendable frame meet, and the extendable frame forms a cargo space at an extended position.

In one embodiment, the cargo space varies as the extendable frame moves away from the main frame or moves toward the main frame.

In another embodiment, the scooter further comprises a steering column connected to the frame assembly, and a user space in the main frame and the cargo space are separated by the steering column.

In another embodiment, the steering column is connected to the main frame.

In another embodiment, the wheel assembly includes a front wheel assembly connected to the extendable frame and a rear wheel assembly connected to the main frame. A wheel distance between the front wheel assembly and the rear wheel assembly varies as the extendable frame extends away from the interface and retracts toward the interface.

In another embodiment, the cargo space is located between the front wheel assembly and the steering column.

In another embodiment, the main frame includes a receiving channel and the extendable frame is moveable in the receiving channel.

In another embodiment, the receiving channel includes at least one recess and the extendable frame includes at least one rib that is capable of being received in the recess.

In another embodiment, the scooter further includes a locking mechanism to lock the extendable frame to the main frame at a plurality of positions such that the cargo space with different dimensions are formed.

In another embodiment, the locking mechanism includes a plurality of protrusions on the extendable frame along a length-wise direction of the scooter and an opening on the main frame. Each protrusion includes an elastic member capable of being biased and configured to be received in the opening and released from the opening under a force.

In another embodiment, the scooter further includes a steering tether connected with the steering column and the rear wheel assembly, respectively. The tether is disposed along a length of the main frame, and the steering operation of the scooter is performed by a rear wheel.

In another embodiment, the scooter further includes a front wheel steering assembly. The front wheel steering assembly includes a first steering arm connected to the steering column, a second steering arm disposed on a front end of the extendable frame and connected with a front wheel, and an extendable steering rod connected with the first steering arm and the second steering arm via hinges.

In another embodiment, the extendable steering rod includes a plurality of segments to accommodate a changed length of the extendable frame.

In another embodiment, the scooter further includes an electric motor to drive the scooter and a battery to power the electric motor. The electric motor and the battery are disposed on the main frame.

According to another aspect of the present disclosure, a scooter comprises a frame assembly, a wheel assembly connected to the frame assembly and a steering column connected to the wheel assembly. The frame assembly includes a main frame and an extendable frame. The wheel assembly includes a front wheel assembly and a rear wheel assembly. A first end of the extendable frame is connected to the front wheel assembly, and a second end of the extendable frame is moveably connected to the main frame. The extendable frame is configured to be moveable from an interface at which the extendable frame and the main frame meet and is locked to at least one position so as to form a cargo space between the front wheel assembly and the steering column and a space for a user between the steering column and the rear wheel assembly on the main frame. The extendable frame is of a U-shape formed by at least one rod.

In one embodiment, the scooter further includes a foldable cargo case coupled to the steering column, and a volume of the cargo case is adjustable based on the cargo space on the extendable frame.

In another embodiment, the steering column is connected to the main frame via a steering column sleeve, and the steering column sleeve is pivotably connected to the main frame.

In another embodiment, the extendable frame includes a fixing member to secure the cargo case. The fixing member includes an elastic string with a clip at one end, and the elastic string is configured to pass around the cargo case to place the clip into a matching clip on the extendable frame.

In another embodiment, the main frame includes a receiving channel and the extendable frame is moveable in the receiving channel.

In another embodiment, the steering column is foldable to a position substantially parallel to a surface of the main frame.

One or more advantageous features as described herein are believed to be readily apparent from the following detailed description of one or more embodiments when taken in connection with the accompanying drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
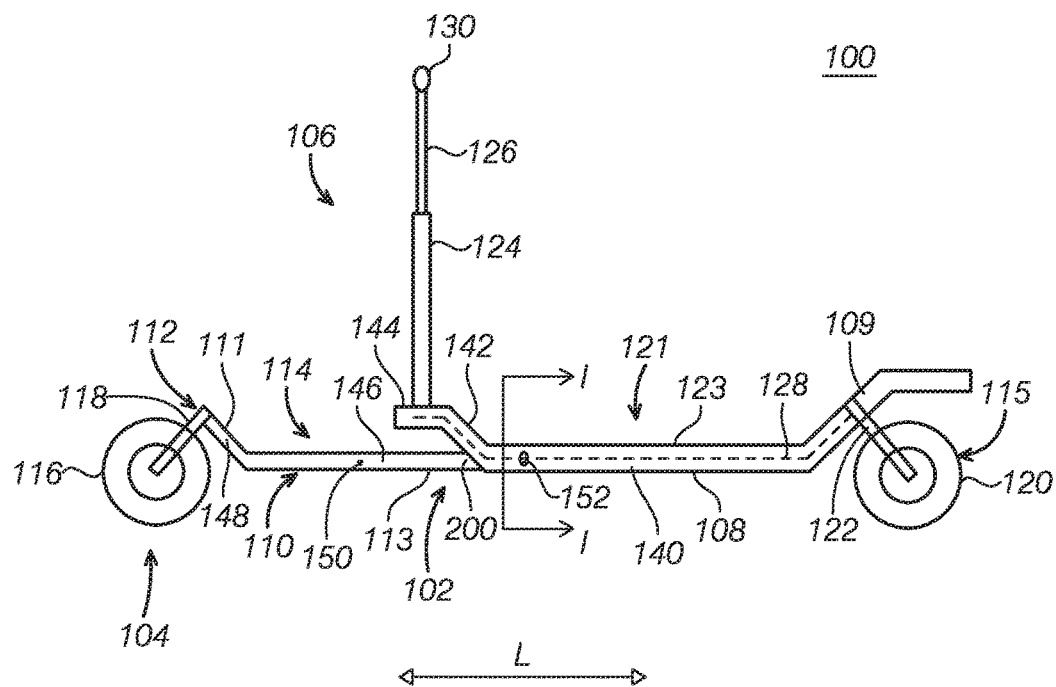
FIG. 1 depicts a side view of a scooter according to one or more embodiments of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

FIG. 1 depicts a side view of a scooter 100 according to one or more embodiments of the present disclosure. The scooter 100 includes a frame assembly 102, a wheel assembly 104 connected to the frame assembly 102 and a steering assembly 106 connected to the frame assembly 102 and the wheel assembly 104. The frame assembly 102 includes a main frame 108 and an extendable frame 110. The main frame 108 defines a user space 121, and more specifically a space or an area is formed on the main frame 108 for the user. The main frame 108 includes a foot area 123 to accommodate feet of the user. In one or more embodiments, and as illustrated in FIG. 1, the extendable frame 110 defines a cargo space 114 at an extended position. The wheel assembly 104 may include a front wheel assembly 112 and a rear wheel assembly 115. In one or more embodiments, the front wheel assembly 112 may connect to a front end 111 of the extendable frame 110 and include a front wheel 116 and a front bracket 118 to attach the front wheel 116 to the front end 111 of the extendable frame 110. It is to be understood that the front bracket 118 and the extendable frame 110 may be integrally formed as one-piece when a rear wheel steering is employed. The rear wheel assembly 115 may connect to a rear end 109 of the main frame 108 and include a rear wheel 120 and a rear bracket 122 to attach the rear wheel 120 to the rear end 109 of the main frame 108. In one or more embodiments, the steering assembly 106 may include a steering column sleeve 124 pivotably connected to the main frame 108, a steering column 126 connected to the main frame 108 via the steering column sleeve 124 and a steering tether 128 positioned in the main frame 108 to connect the steering column 126 and the rear bracket 122 for facilitating a steering of the rear wheel 120. In one or more embodiments, the steering column 126 includes a handle 130 positioned thereon. Further, the handle 130 is pivotably connected to the steering column 126.

Figures 2A, 2B:
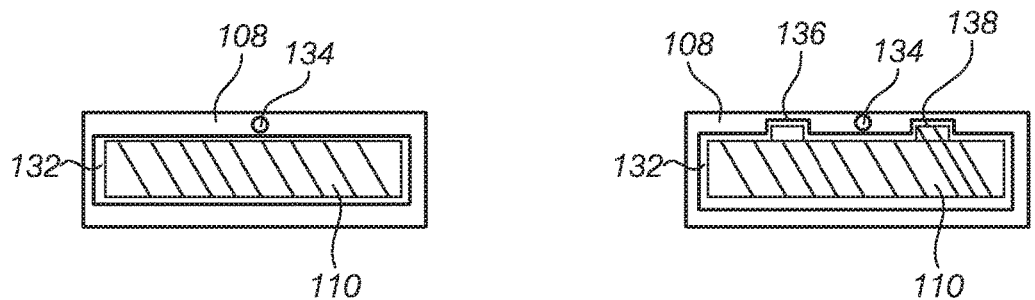
FIG. 2A depicts a cross-sectional view of the scooter referenced in FIG. 1 along line I-I.
FIG. 2B depicts a cross-sectional view of the scooter referenced in FIG. 1 along line I-I according to an alternative embodiment.

Referring to FIG. 2A and with reference to FIG. 1, FIG. 2A depicts a cross-sectional view of the scooter in FIG. 1 along line I-I. In one or more embodiments, a front end 111 of the extendable frame 110 is connected to the front wheel assembly 112, and a rear end 113 of the extendable frame 110 is movably connected to the main frame 108. The main frame 108 may include a receiving channel 132 extending in a lengthwise direction L, and the rear end 113 of the extendable frame 110 is movably received in the receiving channel 132. Further, the main frame 108 may include a slot 134 extending in the lengthwise direction L, and the steering tether 128 is received in the slot 134. Although the receiving channel 132 is separated from the slot 134 as illustrated in FIG. 2A, in one or more embodiments, the receiving channel 132 may communicate with the slot 134. For instance, the slot 134 may include an opening communicating with the receiving channel 132.

FIG. 2B depicts a cross-sectional view of the scooter in FIG. 1 along line I-I according to an alternative embodiment. The main frame 108 may include a receiving channel 132 extending in a lengthwise direction L and at least one recess 136 positioned on the receiving channel 132. Further, the extendable frame 110 includes at least one rib 138 extending in the lengthwise direction L and projecting in a direction perpendicular to the lengthwise direction L. In one or more embodiments, the at least one rib 138 is movably received in the at least one recess 136. The rib 138 not only increases the strength of the extendable frame 110, but also has the guiding function. Further, the main frame 108 also includes a slot 134 extending along the lengthwise direction L, and the steering tether 128 is received in the slot 134.

Figure 3A:
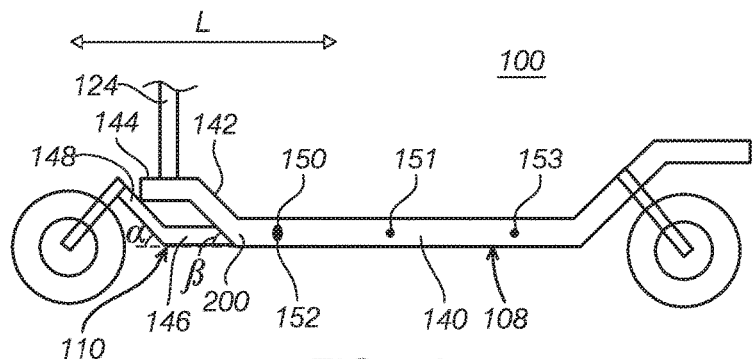
FIG. 3A depicts a side view of the scooter in FIG. 1, illustrating the scooter in a stowed position.
Figure 3B:
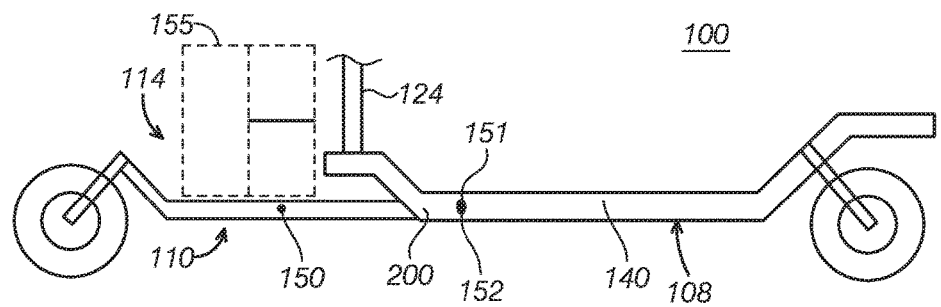
FIG. 3B depicts a side view of the scooter referenced in FIG. 1, illustrating the scooter in a first extended position.

Referring to FIGS. 3A-3B and with further reference with FIG. 1, FIGS. 3A-3B depict the scooter in a stowed position and an extended position, respectively. In one or more embodiments, the main frame 108 includes a first main body 140, a first inclined portion 142 extending forwardly from the first main body 140 and having an angle 3 with the first main body 140, and a first platform portion 144 extending from the first inclined portion 142. In one or more embodiments, angel β may be in a range including but not limited to 15 degrees and 45 degrees. The first platform portion 144 may be substantially parallel to the first main body 140. In other embodiments, the first platform portion 144 may not necessary to be substantially parallel to the first main body 140. In one or more embodiments, the steering column sleeve 124 and steering column 126 may be positioned on the first platform portion 144 such that feet of a passenger may be separated from the steering column sleeve 124 via the first inclined portion 142.

The extendable frame 110 includes a second main body 146 and a second inclined portion 148 extending from the second main body 146 and having an angle α with the second main body 146. In one or more embodiments, angel α may be in a range including but not limited to 15 degrees to 45 degrees. With reference to FIG. 3A, the first platform portion 144 may substantially contact the second inclined portion 148 at the stowed position such that the first inclined portion 142, the first platform portion 144, the second main body 146 and the second inclined portion 148 may collaboratively form a quadrilateral to further strengthen the integrity of the scooter 100. Further, in one or more embodiments, the angle α and angle β may be same such that the first inclined portion 142, the first platform portion 144, the second main body 146 and the second inclined portion 148 may collaboratively form a parallelogram to further enhance the aesthetic appearance of the scooter 100.

Figure 3C:
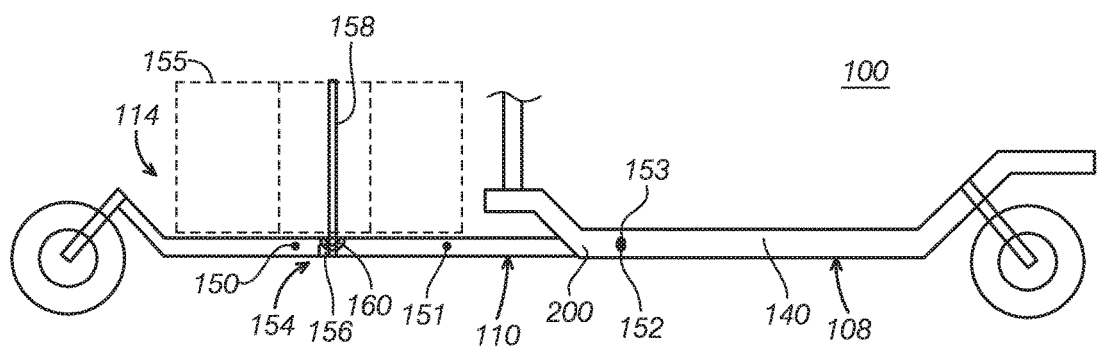
FIG. 3C depicts a side view of the scooter in FIG. 1, illustrating the scooter in a second extended position.

FIG. 3B and FIG. 3C depict the scooter 100 at different extended positions. In one or more embodiments, the scooter 100 may have a plurality of extended positions, for instance a first extended position as illustrated in FIG. 3B and a second extended position as illustrated in FIG. 3C. The extendable frame 110 may be extended away from the main frame 108 at an interface 200 at which the main frame 108 and the extendable frame 110 meet, to positions such as the first extended position as illustrated in FIG. 3B and the second extended position as illustrated in FIG. 3C. The interface 200 may be a place where the extendable frame 110 and the main frame 108 meet. In one or more embodiments, the extendable frame 110 may be extended away from the main frame 108 at the interface 200 at which the extendable frame 110 and the main frame meet. With further reference to FIG. 1, the scooter 100 further includes a locking mechanism to lock the extendable frame 110 to the main frame 108 at a plurality of positions, such as a stowed position and an extended position. In one or more embodiments, the locking mechanism may include a plurality of protrusions 150, 151, 153 on the extendable frame 110 along a length-wise direction L of the scooter 100 and an opening 152 on the main frame 108. Each protrusion 150 may be an elastic biased member and configured to be received in an opening 152 and released from the opening 152 under a force. At the first extended position as illustrated in FIG. 3B, the protrusion 150 is positioned outside the main frame 108 while the protrusion 151 is received in the opening 152 to lock the main frame 108 and the extendable frame 110. At the second extended position shown in FIG. 3C, the protrusions 150, 151 are positioned outside the main frame 108 while the protrusion 153 is received in the opening 152 to lock the main frame with the extendable frame 110. In an alternative embodiment, the locking mechanism may include a plurality of opening 150 positioned on the extendable frame 110 and a locking pin (not shown) positioned on the main frame 108 and corresponding to the opening 152. When the locking pin is pulled out, the extendable frame 110 may be movable relative to the main frame 108; and when the locking pin is plugged in, the extendable frame 110 may be locked relative to the main frame 108.

Turning back to FIG. 1, in one or more embodiments, a cargo space 114 is formed on the extendable frame 110 between the front wheel assembly 112 and the steering column 126 (or steering column sleeve 124), and a user space 121 is formed on the main frame 108 between the steering column 126 (i.e. steering column sleeve 124) and the rear wheel assembly 115. As illustrated in FIG. 3B and FIG. 3C, the cargo space increases as the extendable frame 110 moves away from the main frame 108. Since the main frame 108 is fixed, the foot area remains the same regardless of the change of the cargo space and thus it is easy for the user to operate the scooter on the familiar foot area. Further, the user space 121 and the cargo space is separated by the steering column 126 (i.e. steering column sleeve 124), thus preventing the interference between the cargo and passenger.

Referring to FIG. 3C, the scooter 100 further includes a foldable cargo case 155 detachable connected to the steering column sleeve 124. A volume of the cargo case 155 can be adjusted to accommodate different requirements depending on the cargo space 114. The extendable frame 110 may also include a fixing member 154 to secure the cargo case 155, and the fixing member 154 includes an elastic string 158 with a clip 156 at one end. The elastic string 158 is configured to pass around the cargo case 155 to place the clip 156 into a matching clip 160 on the extendable frame 110. Thus, the cargo case 155 may be firmly positioned in the cargo space 114.

Figure 4:
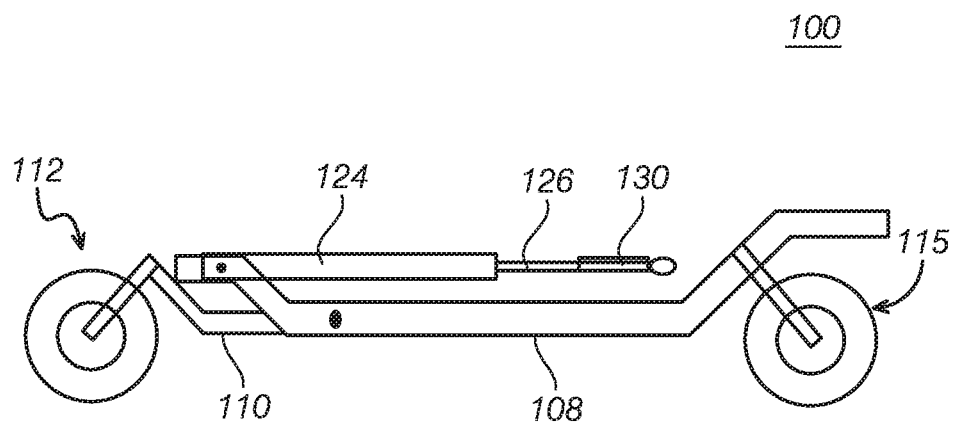
FIG. 4 depicts a side view of the scooter in FIG. 1, illustrating the scooter in a folded position.

FIG. 4 depicts a view of the scooter 110 referenced in FIG. 1 in a stowed position. In one or more embodiments, the steering column sleeve 124 may be foldable to a position substantially parallel to a surface of the main frame 108, thus effectively reducing a space occupied by the scooter 100. Handle 130 is foldable or rotatable to a position substantially parallel to the steering column 126 to reduce lateral space.

Figure 5:
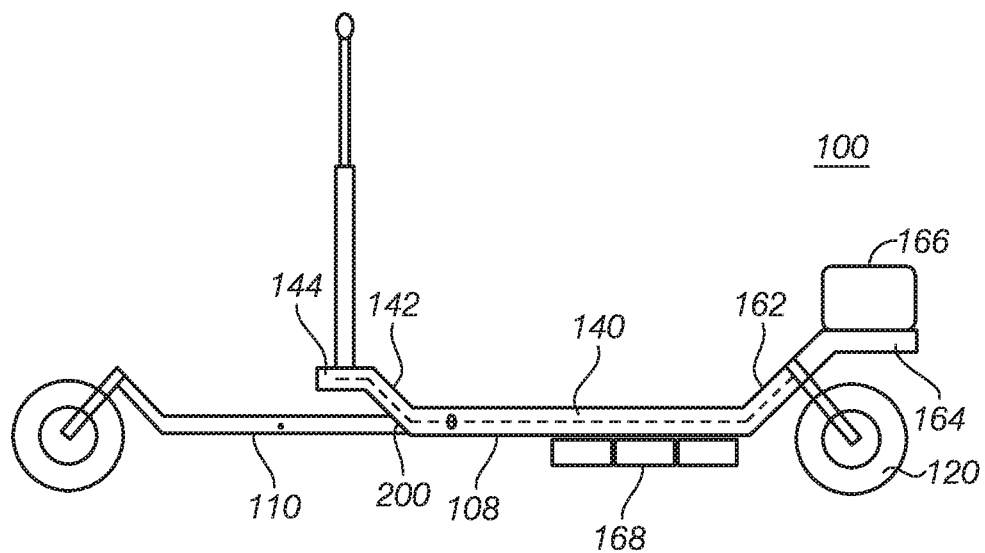
FIG. 5 depicts a side view of a scooter configured with a battery and an electric motor according to one or more embodiments of the present disclosure.

In one or more embodiments, and as illustrated in FIG. 5, the scooter 100 further includes a third inclined portion 162 extending from the first main body 140 and a third platform portion 164 extending from the third inclined portion 162. The third inclined portion 162 has an angle γ with the first main body 140. In one or more embodiments, angle γ may be in a range including but not limited to 30 degrees to 45 degrees. The first inclined portion 142 and the third inclined portion 162 extend in opposite direction along the length-wise direction L. The first inclined portion 142 extends toward the front wheel assembly 112 and the third inclined portion 162 extends toward the rear wheel assembly 115. In one or more embodiments, the third platform portion 164 may be substantially parallel to the first main body 140. The third inclined portion 162 and the third platform portion 164 cover the rear wheel 120 to prevent a passenger from stepping on the rear wheel 120. It is advantageously to guide a passenger to step on a proper place by defining a user space through the first inclined portion 142, a first main body 140 and the third inclined portion 162. Furthermore, in one or more embodiments, the scooter 100 may include an electric motor 166 and a battery 168 to power the electric motor 166. In one or more embodiments, the battery 168 may be positioned below the first main body 140, and the electric motor 166 may be positioned on the third platform 164. It should be understood that the electric motor 166 and the battery 168 may be positioned at any suitable place.

Figure 6A:
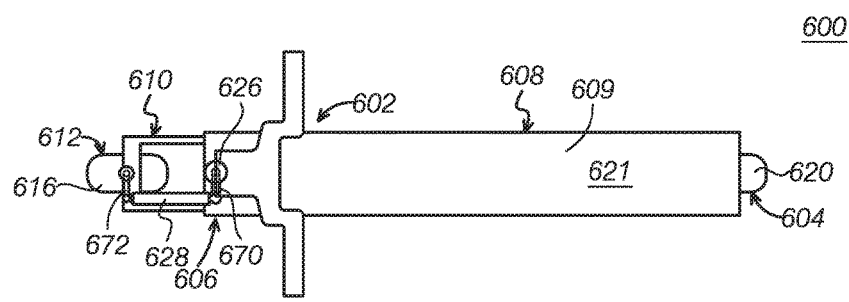
FIG. 6A depicts a top view of a scooter according to one or more alternative embodiments, illustrating the scooter in a stowed position.
Figure 6B:
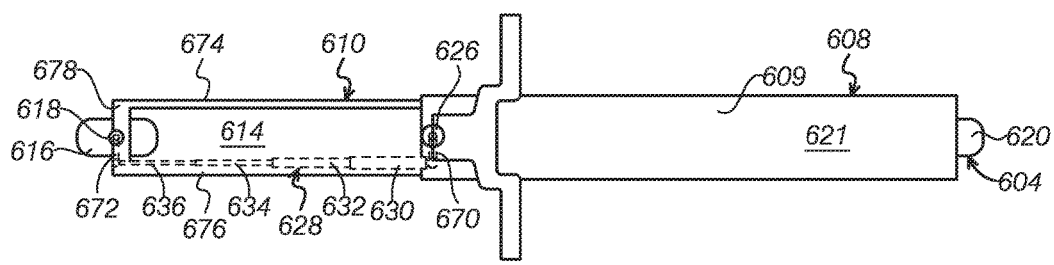
FIG. 6B depicts a top view of a scooter according to one or more alternative embodiments, illustrating the scooter in an extended position.
Figure 6C:
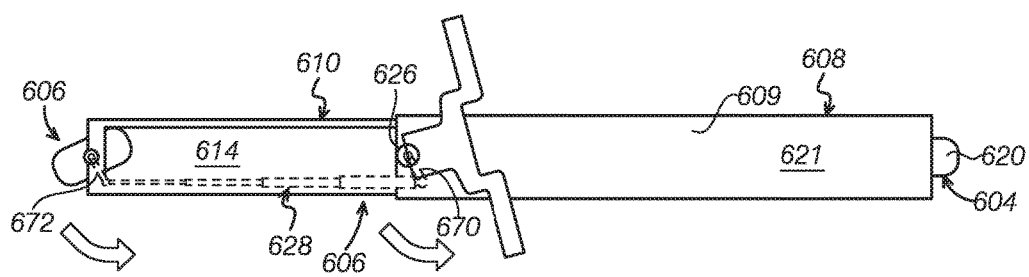
FIG. 6C depicts a top view of a scooter according to one or more alternative embodiments, illustrating the scooter in a steered position.

Now referring to FIGS. 6A-6C, FIGS. 6A, 6B and 6C illustrate top views of the scooter 600 at a stowed position, an extended position and a steered position, respectively according to one or more embodiments. In some embodiments, the scooter 600 includes a frame assembly 602, a front wheel assembly 612 and a rear wheel assembly 604 connected to the frame assembly 602, and a steering assembly 606. The frame assembly 602 includes a main frame 608 and an extendable frame 610. The main frame 608 includes a foot area 609 defining a user space 621 thereon. As shown in FIG. 6B, the extendable frame 610 defines a cargo space 614 at an extended position. In one or more embodiments, the front wheel assembly 612 is connected to the extendable frame 610 and includes a front wheel 616 and a front bracket 618 coupling the front wheel 616 to the extendable frame 610. The rear wheel assembly 604 is connected to the main frame 608 and includes a rear wheel 620 and a rear bracket (not shown) coupling the rear wheel 620 to the main frame 608. The depicted embodiment includes a front wheel steering assembly. The front wheel steering assembly 606 includes a steering column sleeve (not shown) pivotably connected to the main frame 608, a steering column 626 connected to main frame 608 via the steering column sleeve, a first steering arm 670 connected to the steering column 626, a second steering arm 672 connected to the front bracket 618 and an extendable steering rod 628 connected with the first steering arm 670 and the second steering arm 672 via hinges. In one or more embodiments, the first steering arm 670, the extendable steering rod 628 and the second steering arm 672 may be disposed under the extendable frame 610. The extendable steering rod 628 includes a plurality of extendable segments 630, 632, 634, and 636 to accommodate a changed length of the extendable frame between the stowed position illustrated in FIG. 6A and the extended position illustrated in the FIG. 6B. Further referring to FIG. 6C, the steering column 626 rotates the first steering arm 670 when steering, and then the first steering arm 670 pulls the steering rod 628, and further actuates the second steering arm 672, and finally the second steering arm 672 rotates the front bracket 618 and the front wheel to perform the steering operation.

In one or more embodiments, for weight reduction purpose, the extendable frame 610 may include a first rod 674, a second rod 676 being parallel to the first rod 674, and a connecting portion 678 to connect the first rod 674 and the second rod 676. The first rod 674, the second rod 676 and the connecting portion 678 may collaboratively form a U-shaped structure. The main frame 608 further defines a receiving channel (not shown) to receive the first rod 674 and the second rod 676. The rods may be made of light-weighted materials, such as aluminum alloy. The U-shaped extendable frame made from light-weight material reduces the overall weight of the scooter and make it easy for a user to carry the scooter.

The present disclosure provides a scooter including a main frame for user and an extendable frame movable between a stowed position and an extended position. The extendable frame can provide a cargo space when at the extended position. Further, the distance between the front wheel assembly and the rear wheel assembly varies between the stowed position and the extended position. Since the size of the foot area is fixed, the scooter can provide a better maneuverability. Further, the reduced length of the wheel base at the stowed position also provides a compact structure.

While the present invention has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Those skilled in the art will understand that the disclosed examples may be varied, modified, and altered without departing from the scope of the inventions described herein.

The invention claimed is:

1. A scooter, comprising:
    a frame assembly including a main frame, wherein the main frame includes a foot area to accommodate feet of a user;
    an extendable frame movably connected to the main frame, wherein the extendable frame is configured to be extendable away from the main frame at an interface at which the main frame and the extendable frame meet, and the extendable frame forms a cargo space at an extended position;
    a wheel assembly connected to the frame assembly including a front wheel assembly and a rear wheel assembly; and
    a steering column connected to the main frame, wherein a user space is formed on the main frame between the steering column and the rear wheel assembly, and the user space is fixed,
    wherein a wheel distance between the front wheel assembly and the rear wheel assembly varies as the extendable frame moves away from or toward the interface, and
    wherein the cargo space is located between the front wheel assembly and the steering column.

2. The scooter of the claim 1, wherein the cargo space increases as the extendable frame moves away from the main frame.

3. The scooter of claim 1, wherein the main frame includes a receiving channel and the extendable frame is received in the receiving channel and moveable.

4. The scooter of claim 3, wherein the receiving channel includes at least one recess and the extendable frame includes at least one rib that is capable of being received in the recess.

5. The scooter of claim 1, further comprising a locking mechanism to lock the extendable frame to the main frame at a plurality of positions.

6. The scooter of claim 5, wherein the locking mechanism includes a plurality of protrusions on the extendable frame along a lengthwise direction of the scooter and an opening on the main frame, and wherein each protrusion includes an elastic biased member configured to be received in the opening and released from the opening under a force.

7. The scooter of claim 1, further comprising a steering tether connected with the steering column and the rear wheel assembly, respectively, and wherein the steering tether is disposed along a length of the main frame, and the steering operation of the scooter is performed by a rear wheel.

8. The scooter of claim 1, further comprising a front wheel steering assembly, wherein the front wheel steering assembly includes a first steering arm connected to the steering column, a second steering arm disposed on a front end of the extendable frame and connected with a front wheel, and an extendable steering rod connected with the first steering arm and the second steering arm via hinges.

9. The scooter of claim 8, wherein the extendable steering rod includes a plurality of segments to accommodate a changed length of the extendable frame.

10. The scooter of claim 1, further comprising an electric motor to drive the scooter and a battery to supply power to the electric motor, and wherein the electric motor and the battery are disposed on the main frame.

11. A scooter, comprising:
a frame assembly including a main frame and an extendable frame;
a wheel assembly connected to the frame assembly, wherein the wheel assembly includes a front wheel assembly and a rear wheel assembly;
a steering column connected to the main frame;
wherein a first end of the extendable frame is connected to the front wheel assembly, a second end of the extendable frame is moveably connected to the main frame, wherein the extendable frame is configured to be moveable from an interface at which the extendable frame and the main frame meet and is locked to at least one position so as to form a cargo space between the front wheel assembly and the steering column,
wherein the main frame defines a user space between the steering column and the rear wheel assembly and the user space is fixed, and
wherein the extendable frame includes a first rod, a second rod parallel to the first rod and a connecting portion connecting the first rod and the second rod, and the first rod, the second rod and the connecting portion form a U-shaped structure.

12. The scooter of the claim 11, further comprising a foldable cargo case coupled to the steering column, wherein a volume of the cargo case is adjustable based on the cargo space on the extendable frame.

13. The scooter of claim 11, wherein the steering column is connected to the main frame via a steering column sleeve, and the steering column sleeve is pivotably connected to the main frame.

14. The scooter of claim 11, wherein the extendable frame includes a fixing member to secure a cargo case, the fixing member includes an elastic string with a clip at one end, and the elastic string is configured to pass around the cargo case to place the clip into a matching clip on the extendable frame.

15. The scooter of claim 11, wherein the main frame includes a receiving channel and the extendable frame is moveable in the receiving channel.

16. The scooter of claim 11, wherein the steering column is foldable to a position substantially parallel to a surface of the main frame.

* * * * *